(12) United States Patent
Noh et al.

(10) Patent No.: US 9,316,380 B2
(45) Date of Patent: Apr. 19, 2016

(54) OPTICAL PLATE FOR LIGHTING, AND LIGHTING APPARATUS USING SAME

(71) Applicant: MIRAENANOTECH CO., LTD., Chungcheongbuk-do (KR)

(72) Inventors: Sung-Woo Noh, Seongnam (KR); Hak-Chung Lee, Cheongwon-gun (KR); Joon-Hwan Lee, Yongin (KR); Su-Young Lee, Cheongwon-gun (KR)

(73) Assignee: MIRAENANOTECH CO., LTD., Cheongju (KR)

( * ) Notice: Subject to any disclaimer, the term of this patent is extended or adjusted under 35 U.S.C. 154(b) by 0 days.

(21) Appl. No.: 14/367,220

(22) PCT Filed: Dec. 20, 2012

(86) PCT No.: PCT/KR2012/011186
§ 371 (c)(1),
(2) Date: Jun. 19, 2014

(87) PCT Pub. No.: WO2013/095012
PCT Pub. Date: Jun. 27, 2013

(65) Prior Publication Data
US 2014/0362579 A1     Dec. 11, 2014

(30) Foreign Application Priority Data

Dec. 20, 2011   (KR) .................. 10-2011-0138530

(51) Int. Cl.
*F21V 5/00*     (2015.01)
*F21V 17/02*    (2006.01)
(Continued)

(52) U.S. Cl.
CPC . *F21V 17/02* (2013.01); *F21V 5/00* (2013.01); *F21V 5/007* (2013.01); *F21V 11/14* (2013.01);
(Continued)

(58) Field of Classification Search
CPC .......... F21V 17/02; F21V 5/007; F21V 5/00; F21V 11/14; G02B 19/0066; G02B 5/0278; G02B 3/0056; G02B 6/0051; F21Y 2101/02; F21Y 2105/001

USPC ................. 362/246, 355, 455, 335
See application file for complete search history.

(56) References Cited

U.S. PATENT DOCUMENTS 7,784,954 B1 *   8/2010   Coleman ........................ 362/19
9,065,181 B2 *   6/2015   De Rosny et al.
(Continued)

FOREIGN PATENT DOCUMENTS

JP    2010-217660 A    9/2010
KR   10-2008-0094989 A   10/2008
(Continued)

OTHER PUBLICATIONS

Kim et al KR 10-2009-0077709 A, Machine translation.*
(Continued)

*Primary Examiner* — Anne Hines
*Assistant Examiner* — Jose M Diaz (57) ABSTRACT

The present invention relates to an optical plate for lighting capable of improving the brightness of light emitted from a light source and adjusting a viewing angle to alleviate side glare phenomenon. The present invention also relates to a lighting. The purpose of the present invention is to provide a structure in which a light-diffusing member and an optical viewing angle adjusting member can independently function; an integrated optical plate for lighting, wherein the thickness of the optical plate for lighting is reduced by the lamination of a light-diffusing member, a transmission layer, and an optical viewing angle adjusting member; a lighting apparatus using thereof. In order to achieve this purpose, the technical properties of an optical plate for lighting according to the present invention have a transmission layer between a light-diffusing member and an optical viewing angle adjusting member while a light-diffusing member, a transmission layer, and an optical viewing angle adjusting member are laminated together.

13 Claims, 9 Drawing Sheets

(51) Int. Cl.
  *G02B 3/00* (2006.01)
  *G02B 5/02* (2006.01)
  *F21V 11/14* (2006.01)
  *F21V 8/00* (2006.01)
  *F21Y 101/02* (2006.01)
  *F21Y 105/00* (2006.01)

(52) U.S. Cl.
  CPC ............ *G02B 3/0056* (2013.01); *G02B 5/0242* (2013.01); *G02B 5/0278* (2013.01); *G02B 6/0051* (2013.01); *F21Y 2101/02* (2013.01); *F21Y 2105/001* (2013.01)

(56) References Cited

U.S. PATENT DOCUMENTS

| | | | |
|---|---|---|---|
| 2007/0115569 A1* | 5/2007 | Tang et al. | 359/831 |
| 2008/0303777 A1* | 12/2008 | Inoue et al. | 345/102 |
| 2009/0311486 A1* | 12/2009 | Kim et al. | 428/172 |
| 2010/0002468 A1* | 1/2010 | Liu et al. | 362/627 |
| 2010/0165241 A1* | 7/2010 | Kim et al. | 349/61 |
| 2010/0271840 A1* | 10/2010 | Hamada et al. | 362/606 |
| 2010/0328579 A1* | 12/2010 | Shim et al. | 349/64 |
| 2011/0058257 A1* | 3/2011 | Lin et al. | 359/599 |
| 2011/0280004 A1* | 11/2011 | Shimada et al. | 362/97.1 |
| 2012/0224109 A1* | 9/2012 | Okagaki et al. | 348/744 |
| 2012/0268964 A1* | 10/2012 | Bastawros et al. | 362/606 |
| 2013/0044278 A1* | 2/2013 | Kanemitsu et al. | 349/64 |
| 2015/0062485 A1* | 3/2015 | Lee et al. | 349/61 |
| 2015/0171234 A1 | 6/2015 | Ushinsky et al. | |
| 2015/0179981 A1 | 6/2015 | Inoue et al. | |

FOREIGN PATENT DOCUMENTS

| | | |
|---|---|---|
| KR | 10-2009-0071714 A | 7/2009 |
| KR | 10-2009-0077709 A | 7/2009 |
| KR | 10-2010-0034127 A | 4/2010 |
| KR | 10-2010-0084766 A | 7/2010 |
| KR | 10-0976542 B1 | 8/2010 |
| KR | 10-2011-0039042 A | 4/2011 |
| KR | 10-2011-0059146 A | 6/2011 |
| KR | 10-2011-0089592 A | 8/2011 |
| KR | 10-2011-0109737 A | 10/2011 |

OTHER PUBLICATIONS

International Search Report for PCT/KR2012/011186 filed on Dec. 20, 2012.

* cited by examiner

OPTICAL PLATE FOR LIGHTING, AND LIGHTING APPARATUS USING SAME

TECHNICAL FIELD

The present invention relates to an optical plate for lighting and a lighting apparatus using the same, more particularly, an optical plate for lighting and a lighting apparatus capable of improving brightness emitted from a light source and reducing side glare by adjusting viewing angles.

BACKGROUND ART

Recently, due to economic benefits of LED providing a semi-permanent life with a high energy efficiency and brightness relative to conventional light sources such as an incandescent lamp, a fluorescent light, a halogen lamp, etc. used for a lighting apparatus and the improvement of optical characteristics of white LED enabled by the distribution of blue LED, the dominance of white LED over conventional light sources such as an incandescent lamp, a fluorescent light, a halogen lamps, etc. is growing.

Due to the insufficient intensity of light, a single LED diode alone cannot fulfil the normal usage of LED lighting. Thus, in general, multiple diodes are distributed within an LED array working as a surface light source to be embodied in an LED light apparatus. However, LED light has a strong characteristic of straight progression which makes each diode in the array independently visible, wherein incurs peripheral light leakage creating glare problems and eventually resulting discomfort to viewers.

To solve such problems, it is suggested to use a light reflector of the conventional lighting apparatus to set a limit on viewing angles of LED lighting. Typical related art documents are as follows.

Patent Document 1, the title of 'High Illumination Reflector for LED Lighting Unit', discloses a device that utilizes a high illumination reflector to reflect light emitted from LED and direct it facing forward in order to control viewing angles for the purpose of sending light to the desired direction only, so as to keep LED light from directly emitting toward a viewer's eye and thus prevent glare or blurred vision.

Patent Document 2, the title of 'Save Electricity Type LED Lighting Device', discloses an anti-glare device that utilizes a reflector to limit viewing angles for light emitted from LED.

Patent Document 3, the title of 'LED Fluorescent Lamp Apparatus', discloses a device that utilizes a reflector fixed on an LED fluorescent lighting apparatus to improve brightness and prevent glare and heat.

Patent Document 4, the title of 'LED Plane Light', discloses a lighting apparatus that utilizes a reflector mounted at the upper part of the PCB equipped with an LED surface light source in order to converge light in the desired direction for the higher efficiency.

Patent Document 5, the title of 'LED Lighting Lamp', discloses a device that utilizes a reflector with various angles in order to focus light emitted from LED diodes on the desired direction.

Patent Document 1 to 5 mentioned herein utilized a reflector of conventional fluorescent lights in order to limit viewing angles of a lighting apparatus and prevent glare. Despite differences in the specific forms of light source, they share a common element of adopting a reflector from conventional lighting apparatuses.

However, as described above, LED light source has a prominent attribute of straight progression which is incapable of removing independent visibility of every single LED diode. In order to solve this problem, there introduced a technology to diffuse light emitted from LED which means to distribute light-diffusing members on LED to prevent the independent visibility of each LED diode.

Patent Document 6, the title of 'Opening and Shutting Structure of an electric lamp', discloses a device in which a light diffusion cover is installed on the LED module to enable light emitted from the LED module to diffuse during the progress.

In spite of merits disclosed in Patent Document 6, wherein a light-diffusing member prevents each LED diode from being independently visible, the diffusion of light widens viewing angles and eventually intensifies glare problem. Accordingly, there introduced another technology that is to place an optical viewing angle adjusting member on a light-diffusing member to converge diffused light.

Patent Document 7, the title of 'Front Plate for Light Lamp and Lighting Apparatus Having the Same', discloses a device in which light emitted from a light source is diffused in a light-diffusing layer and condensed by patterns formed in a structural layer as it penetrates the structural layer.

Nevertheless, as described in Patent Document 7, wherein a light-diffusing member (light-diffusing layer) and an optical viewing angle adjusting member (structural layer) are condensed, the index matching takes place between the light-diffusing member and the optical viewing angle adjusting member. This sharply diminished the attribute of the optical viewing angle adjusting member while drastically augmenting the attribute of the light-diffusing member in the lower part and exposed the necessity of the structure that allows the light-diffusing member and the optical viewing angle adjusting member to function independently. In addition, because a light-diffusing member and an optical viewing angle adjusting member have been produced separately and then condensed so far, each of them was bent by gravity thus bound to be thicker than necessary (1.5 mm or less). Consequently, the overall thickness of the thickened optical plate for lighting became problematic.

RELATED ART DOCUMENT

Patent Document (Patent Document 1) KR 10-2011-0059146 A (Jun. 2, 2011.)
(Patent Document 2) KR 10-2010-0034127 A (Apr. 1, 2010.)
(Patent Document 3) KR 10-2011-0089592 A (Aug. 9, 2011.)
(Patent Document 4) KR 10-2011-0039042 A (Apr. 15, 2011.)
(Patent Document 5) KR 10-2010-0084766 A (Jul. 28, 2010.)
(Patent Document 6) KR 10-0976542 B1 (Aug. 11, 2010.)
(Patent Document 7) KR 10-2011-0109737 A (Oct. 6, 2011.)

DISCLOSURE

Technical Problem

An object of the present invention is to provide a structure that enables a light-diffusing member and an optical viewing angle adjusting member to function independently for an optical plate for lighting including a light-diffusing member and an optical viewing angle adjusting member.

Another object of the present invention is to provide an integrated optical plate for lighting in which a light-diffusing member, a transmission layer, and an optical viewing angle adjusting member are laminated together to alleviate gravitational deflection which thins out the thickness of an optical plate for lighting from the existing thickness (3 mm or less) of the double-layer structure with a light-diffusing member and an optical viewing angle adjusting member formed separately to the thickness (1.5 mm or less) of one integrated optical plate for lighting, and a lighting apparatus using the same.

The other object of the present invention is to improve the optical viewing angle adjustment function for an optical plate for lighting by forming a pattern layer in an optical viewing angle adjusting member.

Technical Solution

In order to achieve the objects herein, the technical feature of an optical plate for lighting according to the present invention is to be equipped with a light-diffusing member, an optical viewing angle adjusting member, and a transmission layer.

In addition, a light-diffusing member, an optical viewing angle adjusting member, and a transmission layer are laminated together to form an integrated optical plate for lighting.

Moreover, a pattern layer is formed on one or both sides of an optical viewing angle adjusting member in order to adjust viewing angles of a lighting apparatus.

Advantageous Effects

According to an optical plate for lighting based upon the present invention and a lighting apparatus using the same, the inability to efficiently control optical viewing angles for an optical viewing angle adjusting member using the conventional structure in which a light-diffusing member and an optical viewing angle adjusting member are condensed can be resolved by separating a light-diffusing member and an optical viewing angle adjusting member using a transmission layer.

In addition, according to the present invention, when a light-diffusing member, a transmission layer, and an optical viewing angle adjusting member are integrally formed, the overall thickness of an optical plate for lighting is reduced.

Moreover, according to the present invention, viewing angles of a lighting apparatus can be controlled by adjusting the absolute refractive index of each a light-diffusing member, a transmission layer, and an optical viewing angle adjusting member. And such an adjustment function can be reinforced by a pattern layer formed in an optical viewing angle adjusting member.

BEST MODE

Figure 1:
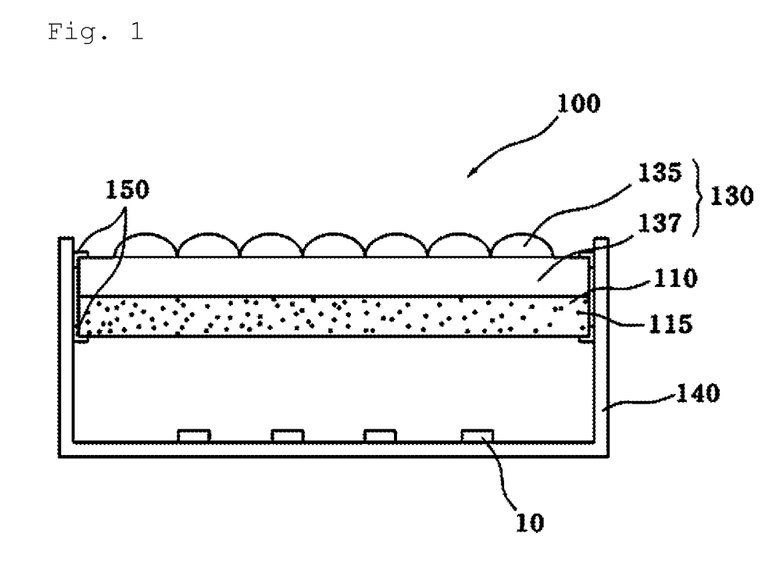
FIG. 1 illustrates a conventional lighting apparatus.

FIG. 1 illustrates a conventional lighting apparatus. As illustrated in FIG. 1, a conventional lighting apparatus 100 has an optical viewing angle adjusting member 130 fixed on a light-diffusing member 110 and both the light-diffusing member 110 and the optical viewing angle adjusting member 130 are pressed and fixed between supporting members 150 installed on a frame 140. In other words, a light-diffusing member 110 and an optical viewing angle adjusting member 130 of a conventional lighting apparatus are not laminated together but independently supported, therefore, each member needs a certain level of thickness to prevent gravitational deflection.

The light-diffusing member 110 functions to diffuse light emitted from LED 10 and is produced consisting of diffusive particles 115 such as diffusive materials, diffusive beads, etc.

The optical viewing angle adjusting member 130 collects light diffused from the light-diffusing member 110 in order to have desired viewing angles and this effect is possible by a pattern layer 135 formed in the light-diffusing member 110. The pattern layer 135 of the optical viewing angle adjusting member 130 is formed on a flat surface, referred to, a base layer 137. Generally a polycarbonate-based material is used for this base layer 137 because of its high permeability of light and ability to reduce distortion caused by the heat generated from a light source.

Figure 2:
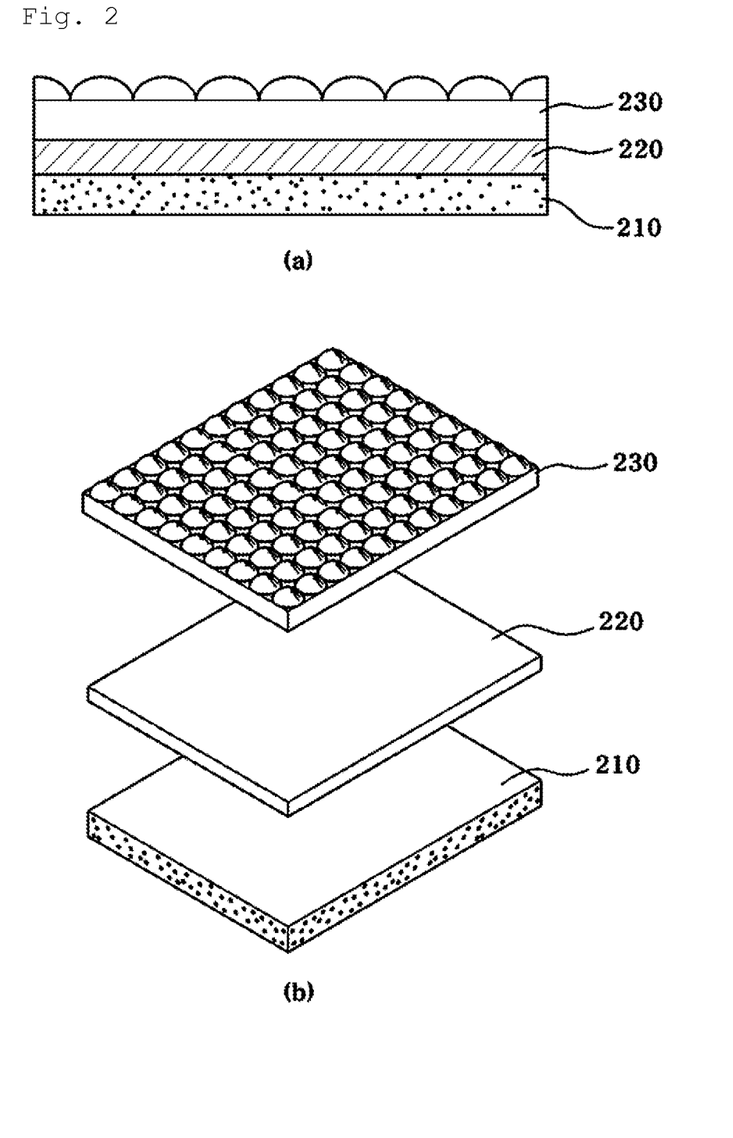
FIG. 2 is a cross-sectional view and an exploded perspective view of an optical plate for lighting according to an exemplary embodiment of the present invention.

FIG. 2 is a cross-sectional view and an exploded perspective view of an optical plate for lighting according to an exemplary embodiment of the present invention.

As illustrated in FIG. 2, a transmission layer 220 placed between a light-diffusing member 210 and an optical viewing angle adjusting member 230 that controls the pathway of diffused light to create a uniform field of viewing angles, enables each of the light-diffusing member 210 and the optical viewing angle adjusting member 230 to independently perform their functions of diffusing light and adjusting optical viewing angles respectively. If the refractive index between the light-diffusing member 210 and the transmission layer 220 is different from the refractive index between the transmission layer 220 and the optical viewing angle adjusting member 230, an optical plate for lighting will have a better feature. In general, most commonly used materials in optical elements have the absolute refractive index of 1.7 or less and vacuum has the absolute refractive index of 1, therefore, it is preferable that the transmission layer 220 has a smaller absolute refractive index than the light-diffusing member 210 or the optical viewing angle adjusting member 230 by 0.1 to 0.7, in fact, 0.3 to 0.6 is more desirable.

Meanwhile, a recommended height of the transmission layer 220 is 0.5 to 500 μm. It is because when an LED light source is installed on the rear side of an optical sheet and the height of the transmission layer 220 is shorter than 0.5 μm, each diode of the LED light source becomes independently visible (the haze value decreases) and thus incurs discomforts to the viewers. Besides, even with the height of the transmission layer exceeding 500 μm, it cannot improve the independent visibility of the LED light source.

Since the transmission layer 220 functions to detach the light-diffusing member 210 and the optical viewing angle adjusting member 230 from each other, there is no restriction for its material as long as light can easily transmit it. Typical materials for the transmission layer are air and water with the absolute refractive index of 1 and 1.33 respectively.

Figure 3:
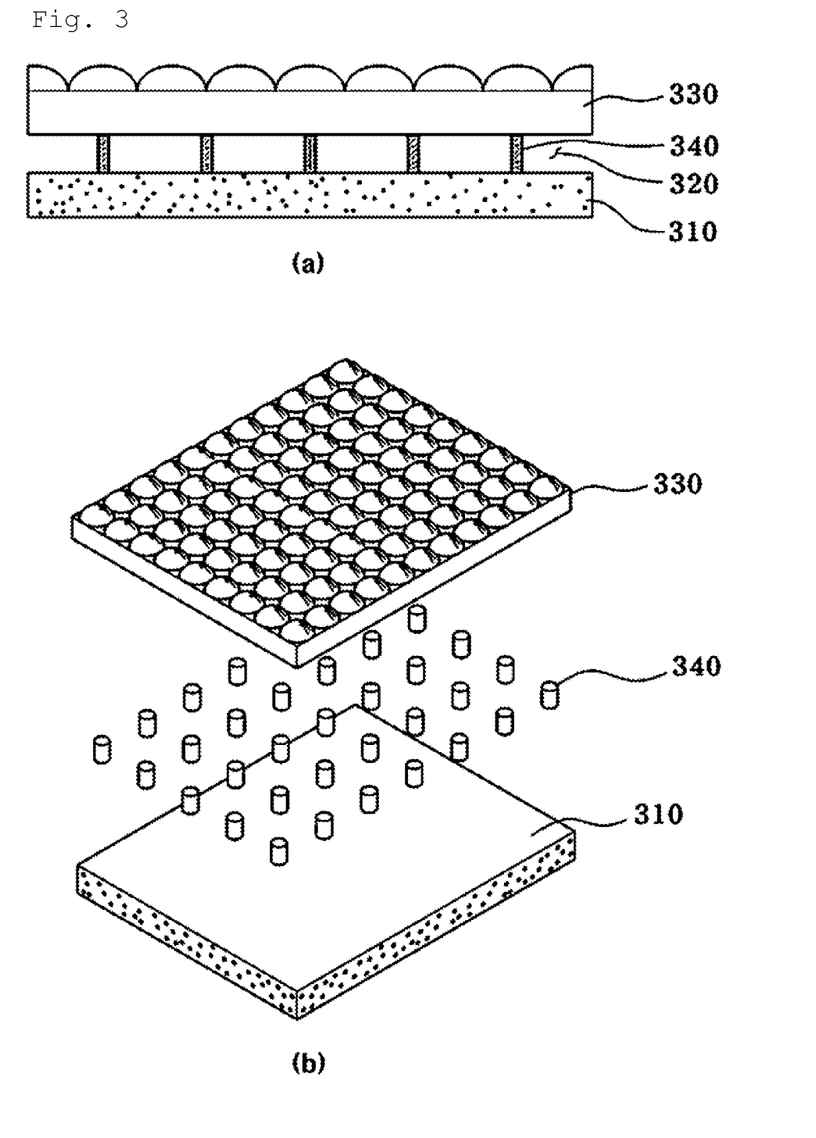
FIG. 3 is a cross-sectional view and an exploded perspective view of an optical plate for lighting according to another exemplary embodiment of the present invention.

FIG. 3 is a cross-sectional view and an exploded perspective view of an optical plate for lighting according to another exemplary embodiment of the present invention.

As illustrated in FIG. 3, in an optical plate for lighting according to another exemplary embodiment of the present invention, spacers 340 are distributed randomly or in an orderly fashion forming a regular pattern to separate a light-diffusing member 310 and an optical viewing angle adjusting member 330.

Because spacers 340 can either reflect light or alter light's pathway, it is more efficient to have the smaller sum of cross-sectional area of spacers relative to the entire area of the optical plate for lighting. However, considering the cohesive strength between the light-diffusing member 310 and the optical viewing angle adjusting member 330, the sum of cross-sectional area of spacers is preferable to be 1 to 40% of the entire area of the optical plate for lighting or 1 to 20% more ideally. If the sum of cross-sectional area of spacers relative to the entire area of the optical plate for lighting is smaller than 1%, the adhesive strength between the light-diffusing member and the optical viewing angle adjusting member becomes less than 0.05 kgf on the Release Test at 180 degree and this indicates a very poor cohesive property. If the sum of cross-sectional area of spacers exceeds 40% of the entire area of an optical plate for lighting, it affects the overall speed of light of the lighting apparatus and can create a problem by slowing down the speed of light. Types of adhesives for the spacers are UV, thermosetting adhesives, thermoplastic adhesives, aerobic and anaerobic adhesives, PSA (Pressure Sensitive Adhesive, pressure-sensitive adhesive), etc., and adhesion methods are printing, imprinting, laser or ultrasonic welding, etc.

Note that several examples of the method to manufacture an optical plate for lighting according to this exemplary embodiment are as follows:
1) Imprint UV-curable resin on a light-diffusing member in order to form spacers, and then attach an optical viewing angle adjusting member.
2) Stamp a light-diffusing member using a thermal compression stamping method in order to form spacers, and then attach an optical viewing angle adjusting member.
3) Insert a fixture on a light-diffusing member in order to form spacers, and then attach an optical viewing angle adjusting member.

Meantime, the height of the spacer is recommended to be 1 mm or less, preferably less than 500 μm, more preferably less than 100 μm. It is because, as the height of the spacer gets higher, the cross-sectional area of the spacer should be formed wider as well. If the height of the spacer exceeds 1 mm, the sum of cross-sectional area of spacers will exceed 40% of the entire area of the optical plate for lighting and consequently, it will be inadequate for lighting purposes. Also, the taller the spacer is, the more vulnerable it becomes to the stress caused by bending which can easily separate the lamination between the light-diffusing member and the optical viewing angle adjusting member. Therefore, the height of the spacer should be properly set within the range, wherein the light source cannot be visible.

In this exemplary embodiment, spacers 340 create an air layer 320 between the light-diffusing member 310 and the optical viewing angle adjusting member 330, and this air layer 320 is a special form of a transmission layer in FIG. 2. In other words, the air layer placed between the light-diffusing member 310 and the optical viewing angle adjusting member 330 performs its role as a medium having a large gap of absolute refractive index in order to make the light-diffusing member 310 and the optical viewing angle adjusting member 330 function independently from each other.

In two exemplary embodiments hereinbefore, a light-diffusing member and an optical viewing angle adjusting member share the same properties as follows.

The thickness of a light-diffusing member 210, 310 can be reduced from the existing 1.5 mm or less to 0.3 mm or less. The desired light diffusion can be achieved in the thinner light-diffusing member by having more than two kinds of diffusing particles with various diameters in a light-diffusing member 210, 310 and distributing the small diffusing particles among the large diffusing particles. Besides, as a light-diffusing member and an optical viewing angle adjusting member are integrally laminated to form an optical plate for lighting, the gravitational deflection by the light-diffusing member itself can be disregarded and accordingly a thinner light-diffusing member becomes available. Meanwhile, a light-diffusing member 210, 310 prevents LED 10 light source from being visible and makes light emit evenly across the board. To fulfil these roles of a light-diffusing member, the haze value of the light-diffusing member 210, 310 is recommended to satisfy between 80% to 99%, and more preferably the range of 90% to 99% should be satisfied.

Figure 4:
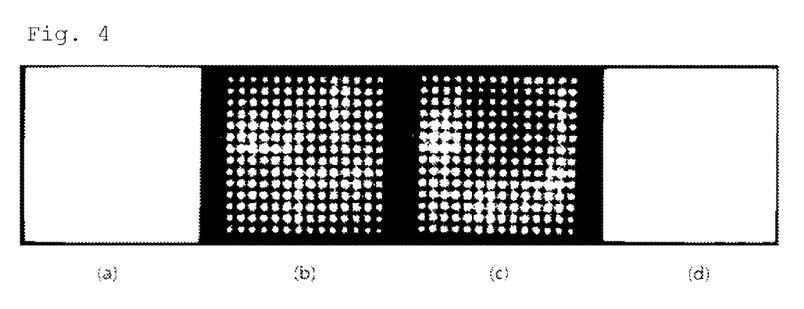
FIG. 4 illustrates the degree of visibility for an LED light source depending upon the haze value of a light-diffusing member.

Note that the visibility of an LED light source depending on the haze value of a light-diffusing member is shown in FIG. 4. FIG. 4(a) represents the spot measurement of a reference (REF) product having an existing structure in which an optical viewing angle adjusting member and a light-diffusing member are independently formed in two layers, and LED herein does not appear to be shielded due to the sufficient haze value. FIGS. 4(b), 4(c), and 4(d), represent the spot measurements at the haze value of 68%, 74%, and 98% respectively. The haze value should be at least 95% or higher to be sufficient for lighting purposes.

The pathway of light is controlled in a pattern layer formed on one or both sides of an optical viewing angle adjusting member 230, 330 to satisfy the UGR value of the lighting apparatus. Types of a pattern formed in an array on the pattern layer (hereinafter referred to as 'pattern-layer pattern') are a single pattern type and a multi-pattern type. A single pattern type is composed of one of followings: lens type, cone type, truncated cone type, polypyramid type and truncated polypyramid type. On the other hand, a multi-pattern type is composed of a truncated cone or a truncated polypyramid mounted with one of followings: lens type, cone type, truncated cone type, polypyramid type and truncated polypyramid type.

UGR value, an assessed measure of the quantified discomfort level when a human eye looks into a light source, is calculated according to the assessment established by CIE (International Commission Illumination) for international standardization of discomfort glare value in 1995.

$$UGR = 8\log\left[\frac{0.25}{L_b}\sum \frac{L_s\omega}{p^2}\right] \quad \text{Equation 1}$$

$L_b$: background brightness [cd/m$^2$]
$L_s$: brightness of lighting apparatus [cd/m$^2$]

ω: solid angle of lighting apparatus [sr]
p: Guth position index of light source The rating scale of the equation 1 is divided into seven stages as shown in the following table, and a lighting apparatus should have the UGR value of 19 or less in all measuring positions.

TABLE 1

| Rating | UGR |
| --- | --- |
| Just Intolerable | 31 |
| Uncomfortable | 28 |
| Just uncomfortable | 25 |
| Unacceptable | 22 |
| Just acceptable | 19 |
| Perceptible | 16 |
| Imperceptible | 10 |

Figure 5:
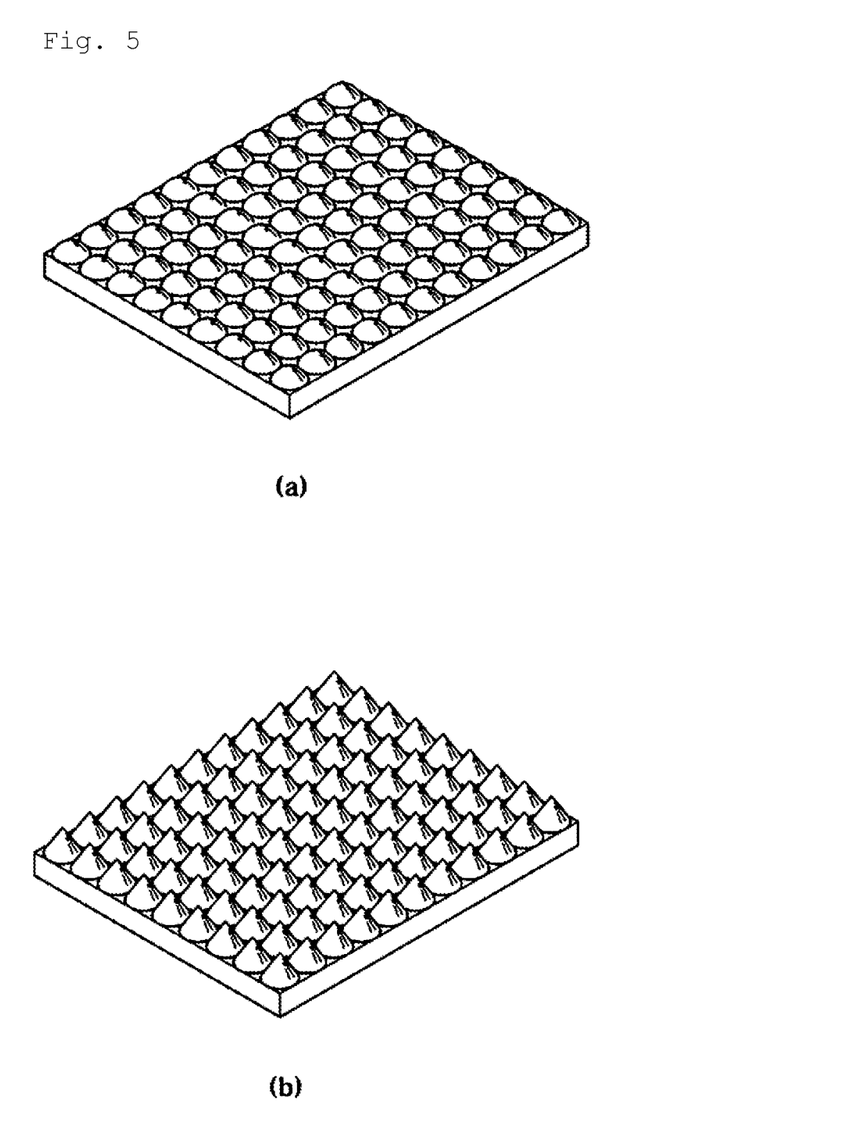
FIG. 5 is a perspective view of a pattern layer formed in an optical viewing angle adjusting member in the present invention.

FIG. 5 is a perspective view of a pattern layer formed in an optical viewing angle adjusting member in the present invention.

In case of a pattern-layer pattern to be a lens type as shown in FIG. 5(a), the lens is recommended to be hemispheric with its height preferable to be ½ of the lens diameter to easily satisfy UGR≤19. However, depending upon the design of the other components such as a light-diffusing member, a transmission layer, etc., the height of the lens has been experimentally confirmed to be variable within the range of 0.4 to 0.8 times of the lens diameter.

In case of a pattern-layer pattern to be a cone or a polypyramid type as shown in FIG. 5(b), the size of the apex angle of the cutting plane determines the intensity of the condensed light as follows.

Figure 6:
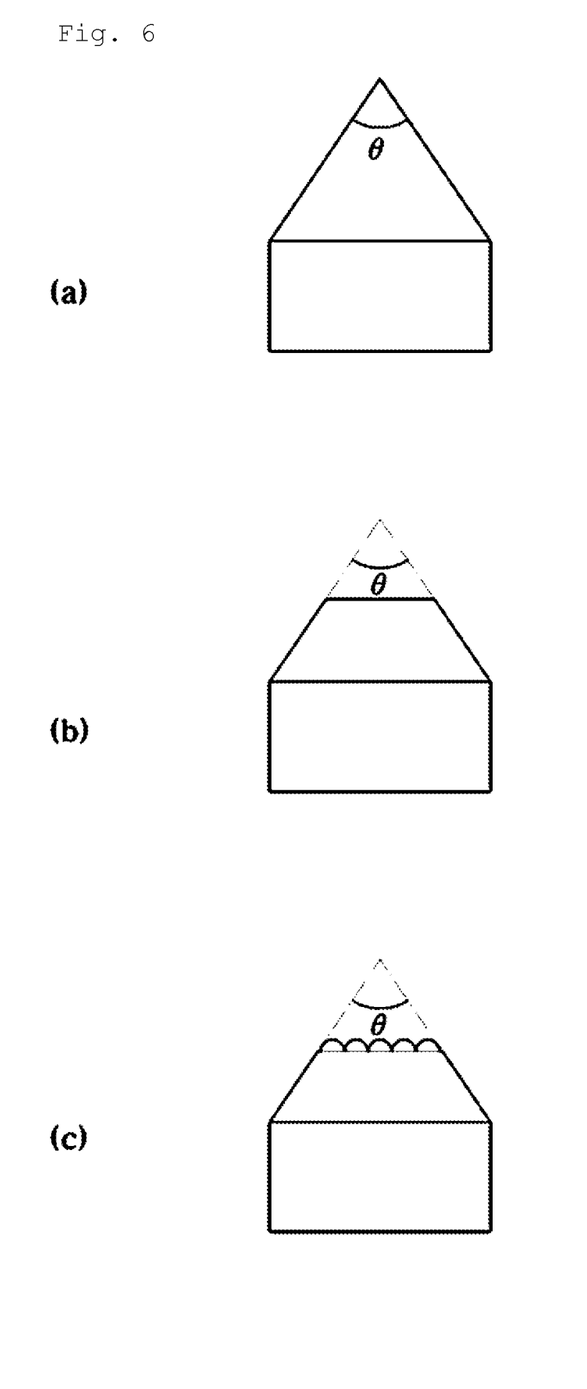
FIG. 6 is an axial-sectional view of a pattern formed in a pattern layer.

FIG. 6 is an axial-sectional view of a pattern formed in a pattern layer.

In case of a pattern-layer pattern to be a cone type as shown in FIG. 6(a), the apex angle (θ) of the axial cutting plane has been experimentally confirmed to be in the range of 20° to 100° to easily satisfy UGR≤19 and more preferably in the range of 30° to 90°. If a pattern-layer pattern is a truncated cone, a truncated polypyramid, etc., therefore, the cutting plane has a trapezoid shape as shown in FIG. 6(b) or FIG. 6(c), then the angle (θ) created by extending the hypotenuse of the trapezoid should be in the range of 20° to 100° to easily satisfy UGR≤19.

Hereto, an optical plate for lighting in which a light-diffusing member, a transmission layer, and an optical viewing angle adjusting member are integrally formed has been described, and this optical plate for lighting can be placed on the pathway of light emitted from a light source to compose a light apparatus.

Figure 7:
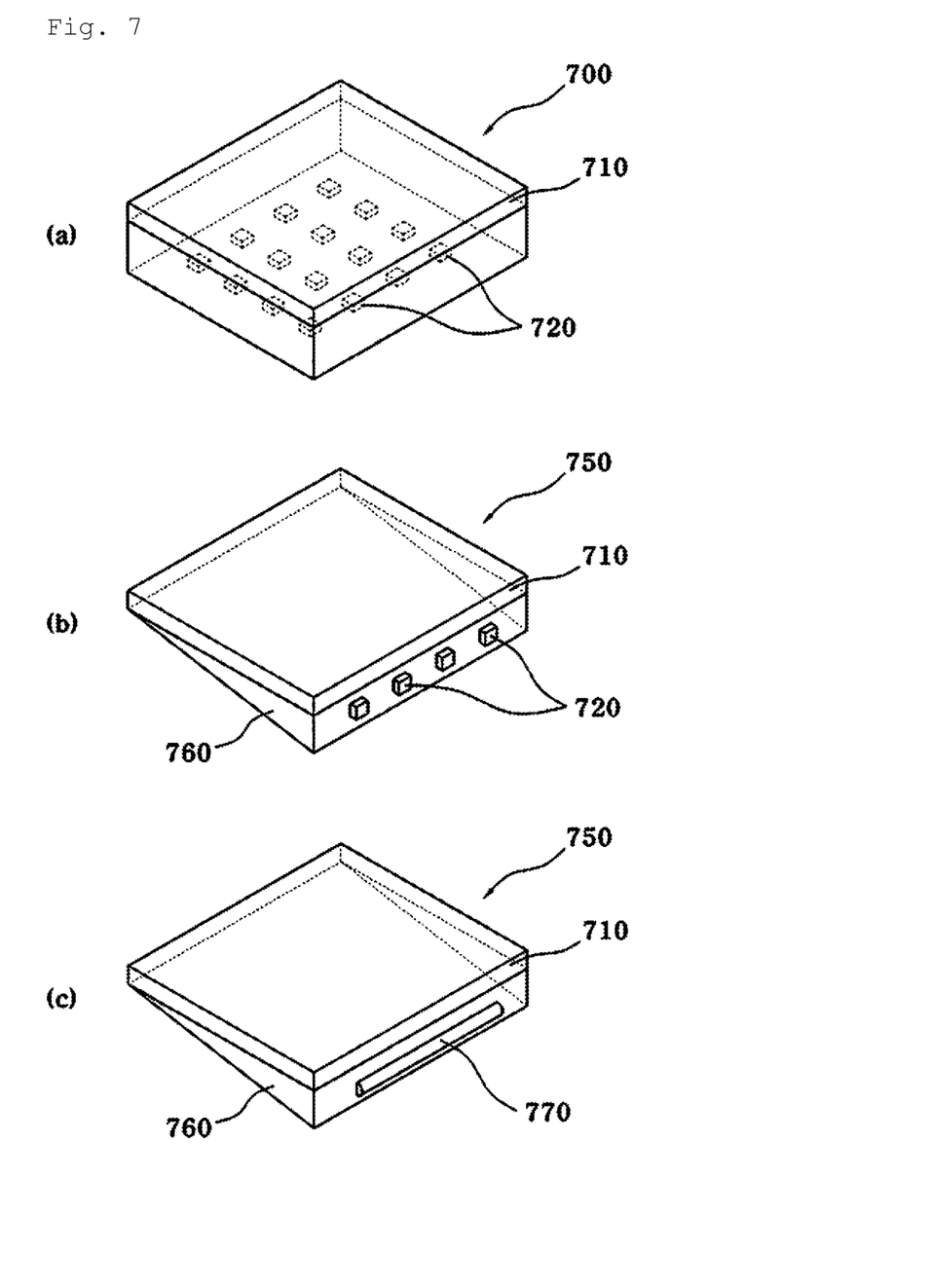
FIG. 7 is a schematic diagram of a lighting apparatus using an optical plate for lighting according to the present invention.

FIG. 7 is a schematic diagram of a lighting apparatus using an optical plate for lighting according to the present invention. FIG. 7(a) illustrates a direct-lit type lighting apparatus 700 in which light emitted from a light source reaches on the surface of an optical plate for lighting 710 directly. On the other hand, FIG. 7(b) and FIG. 7(c) illustrate an edge-lit type lighting apparatus 750 in which light emitted from a light source is reflected at the lower surface of a light guide plate 760 after proceeding along with a light guide plate, and then reaches on the surface of an optical plate for lighting. The direct-lit type lighting apparatus of FIG. 7(a), wherein a light source itself should have the form of a surface light source, an LED light source 720 is distributed on the flat surface to be manufactured. However, in case of the edge-lit type lighting apparatus, either an LED light source 720 having the form of a point light source can be linearly distributed at the edge of a light guide plate 760 as illustrated in FIG. 7(b), or a cold cathode fluorescent lamp (CCFL) 770 having the form of a line light source can be positioned at the edge of a light guide plate 760. In FIG. 7(b) and FIG. 7(c), the line light source appears to be installed only on one side of the light guide plate, this line light source can be placed at the both sides or all sides of the light guide plate depending on the amount of light.

Figure 8:
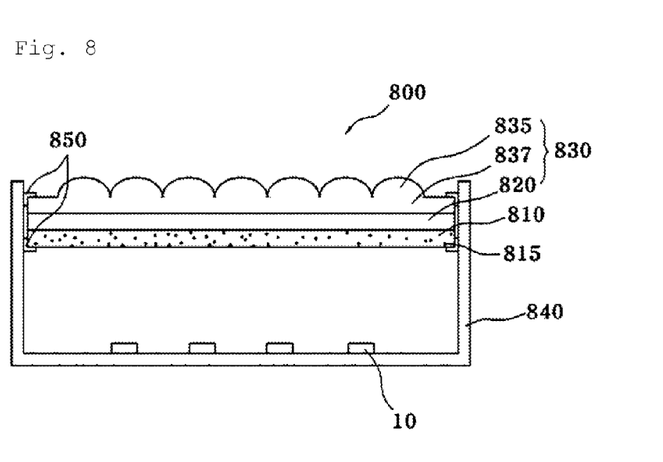
FIG. 8 is a cross-sectional view of a lighting apparatus using an optical plate for lighting according to the present invention.

FIG. 8 is a cross-sectional view of a lighting apparatus using an optical plate for lighting according to the present invention, more particularly, relates to a direct-lit type lighting apparatus using an LED surface light source. As illustrated in FIG. 8, a frame 840 maintains the cohesion of an overall direct-lit type lighting apparatus, and an LED 10 surface light source is installed inside of the frame 840. In the upper part of this LED surface light source, an optical plate for lighting 830 laminated with the condensation of a light-diffusing member 815, a transmission layer 820, a base layer 837, and a pattern layer 835 is placed on the pathway of light emitted from the light source and supported by supporting members 850 fixed on the frame hereinbefore. FIG. 8 illustrated a direct-lit type lighting apparatus only, however, an edge-lit type lighting apparatus also employs the same technique in which a light source is fixed on a frame and an optical plate for lighting is held up on the frame by supporting members and placed on the pathway of light emitted from a light source.

Next, provided are the embodiments indicating the changes of optical properties of an optical plate for lighting according to the present invention.

First Embodiment

Figure 9:
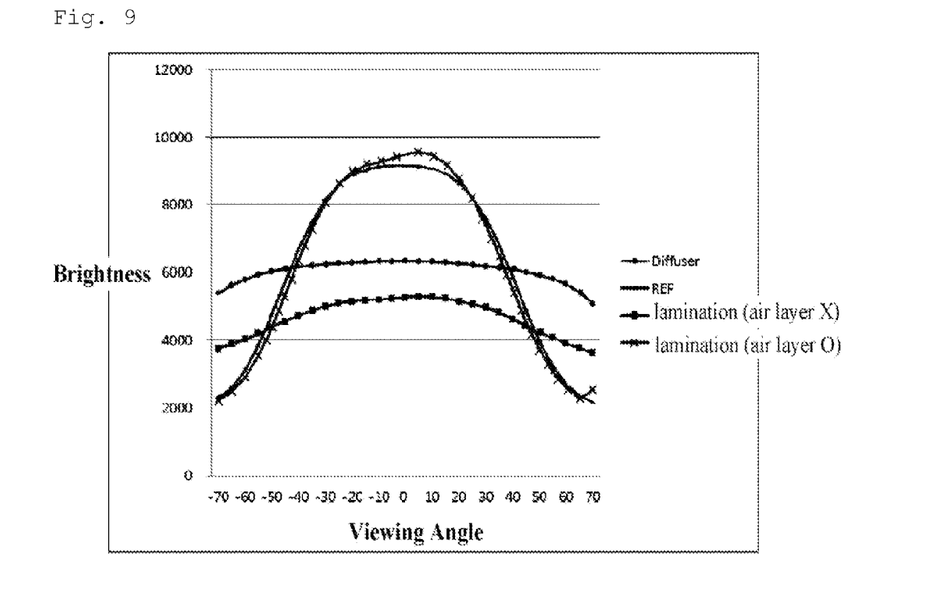
FIG. 9 is a graph of viewing angles and brightness depending on the presence of a transmission layer in an optical plate for lighting.

FIG. 9 is a graph of viewing angles and brightness depending on the presence of a transmission layer in an optical plate for lighting.

As shown in FIG. 9, in the absence of a transmission layer, i.e. for an optical plate for lighting in which a light-diffusing member and an optical viewing angle adjusting member are directly laminated, the brightness is measured as 4000 nt in the range of most viewing angles and the decrease of brightness is imperceptible at either −50° and smaller or 50° and larger. This means that the structure in the absence of a transmission layer has a deteriorated brightness of 4000 nt relative to the structure having a light-diffusing member only with brightness of 6000 nt and does not contribute to eliminate side glare significantly. On the other hand, in case of an air layer placed as a transmission layer between a light-diffusing member and an optical viewing angle adjusting member, the brightness increases to about 9000 nt high in the range of −30° to 30° centering the viewing angle of 0°, while it sharply decreases when the angle is out of the range. This signifies that the side glare is reduced. To put it differently, the quality of viewing angles and brightness of an optical plate for lighting according to the present invention shows no deterioration even compared to the quality of viewing angles and brightness of the reference (REF) using the existing double-layer structure in which a light-diffusing member and an optical viewing angle adjusting member are formed independently.

Second Embodiment

Figure 10:
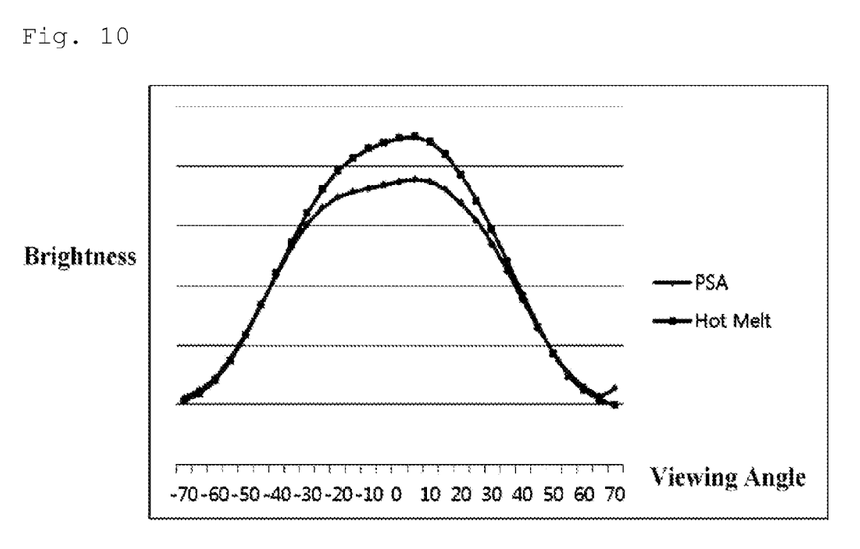
FIG. 10 is a graph of viewing angles and brightness depending on the type of adhesives used in an optical plate for lighting according to the present invention.

FIG. 10 is a graph of viewing angles and brightness depending on the type of adhesives used in an optical plate for lighting according to the present invention.

According to FIG. 10, using a hot-melt adhesive improves brightness near the viewing angle of 0° over a PSA, however, there is no significant difference in terms of side glare reduction.

DETAILED DESCRIPTION OF MAIN ELEMENTS 10, 720 LED
100 conventional lighting apparatus
110, 210, 310, 810 light-diffusing member
115, 815 diffusing particle
130, 230, 330, 830 optical viewing angle adjusting member
135, 835 pattern layer
137, 837 base layer
140, 840 frame
150, 850 supporting member
220, 820 transmission layer
320 air layer
340 spacer
700, 800 direct-lit type lighting apparatus
710 optical plate for lighting
750 edge-lit type lighting apparatus
760 light guide plate
770 Cold Cathode Fluorescent Lamp (CCFL)

The invention claimed is:

1. An optical plate for lighting, comprising:
a light-diffusing member that diffuses light;
an optical viewing angle adjusting member that controls a pathway of the diffused light to create a uniform viewing angle;
a transmission layer placed between the light-diffusing member and the optical viewing angle adjusting member,
wherein the light-diffusing member, the optical viewing angle adjusting member, and the transmission layer are laminated together, and
wherein the transmission layer is an air layer formed by multiple spacers and placed between the light-diffusing member and the optical viewing angle adjusting member.

2. The optical plate for lighting of claim 1, wherein an absolute refractive index of the transmission layer is different from absolute refractive indices of the light-diffusing member and the optical viewing angle adjusting member.

3. The optical plate for lighting of claim 2, wherein the absolute refractive index value of the transmission layer is smaller than the absolute refractive indices of the light-diffusing member and the optical viewing angle adjusting member.

4. The optical plate for lighting of claim 3, wherein the absolute refractive index value of the transmission layer is 0.1 to 0.7 less than the absolute refractive indices of the light-diffusing member and the optical viewing angle adjusting member.

5. The optical plate for lighting of claim 1, wherein a sum of cross-sectional areas of the multiple spacers is 1 to 40% of an area of a surface of the optical plate for lighting, the cross-sectional areas of the multiple spacers being parallel to the surface of the optical plate.

6. The optical plate for lighting of claim 1, wherein a height of the transmission layer is 0.5 to 500 μm.

7. The optical plate for lighting of claim 1, wherein the light-diffusing member includes diffusing particles consisting of two or more particles having different diameters.

8. The optical plate for lighting of claim 1, wherein the optical viewing angle adjusting member includes a base layer and a pattern layer that is placed on the base layer and controls the pathway of light.

9. The optical plate for lighting of claim 8, wherein an array having a single pattern type or a multi pattern type is placed on the pattern layer, the single pattern type corresponding to one of a lens type, a cone type, a truncated cone type, a polypyramid type, and a truncated polypyramid type, the multi pattern type including first and second types, the first type corresponding to one of the lens type, the cone type, the truncated cone type, the polypyramid type, and the truncated polypyramid type, the second type corresponding to the truncated cone type or the truncated polypyramid type, the first type being formed on the second type.

10. A lighting apparatus, comprising:
a frame;
a light source placed in a lower part of the frame;
an optical plate for lighting placed in a pathway of light emitted from the light source; and
supporting members fixed on the frame, the supporting members holding the optical plate for lighting,
wherein the optical plate includes:
a light-diffusing member that diffuses light;
an optical viewing angle adjusting member that controls a pathway of the diffused light to create a uniform viewing angle; and
a transmission layer placed between the light-diffusing member and the optical viewing angle adjusting member,
wherein the light-diffusing member, the optical viewing angle adjusting member, and the transmission layer are laminated together, and
wherein the transmission layer is an air layer formed by multiple spacers and placed between the light-diffusing member and the optical viewing angle adjusting member.

11. The lighting apparatus of claim 10, wherein a Unified Glare Rating (UGR) value calculated using the following equation is 19 or smaller:

$$UGR = 8\log\left[\frac{0.25}{L_b}\sum \frac{L_s \omega}{p^2}\right],$$

and
wherein Lb is a background brightness [cd/m$^2$], Ls is a brightness of the lighting apparatus [cd/m$^2$], ω is a solid angle of the lighting apparatus [sr], and p is a Guth position index of the light source.

12. The optical plate for lighting of claim 1, wherein the multiple spacers are placed between the light-diffusing member and the optical viewing angle adjusting member.

13. The optical plate for lighting of claim 10, wherein the multiple spacers are placed between the light-diffusing member and the optical viewing angle adjusting member.

* * * * *